Oct. 12, 1943.   L. W. STAHL   2,331,513
SLUSH PUMP
Original Filed Dec. 18, 1937   9 Sheets-Sheet 2
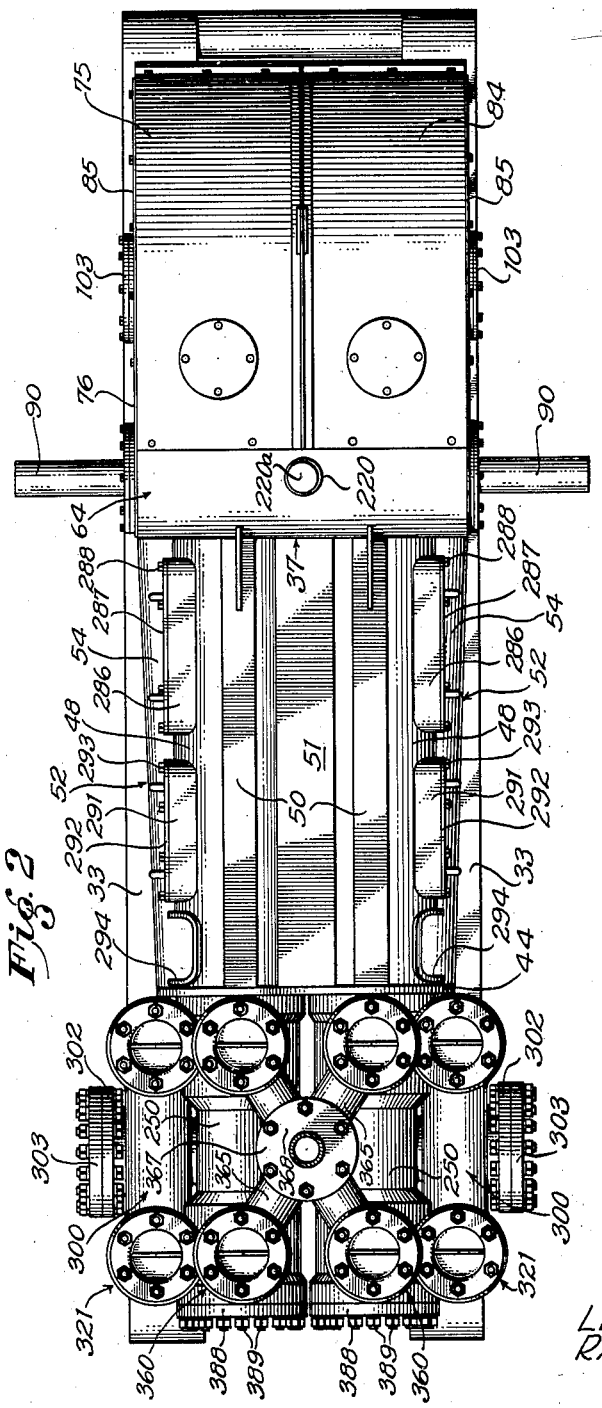
LESLIE W. STAHL and
RALPH L. FOSTER,
INVENTORS.
BY
ATTORNEY

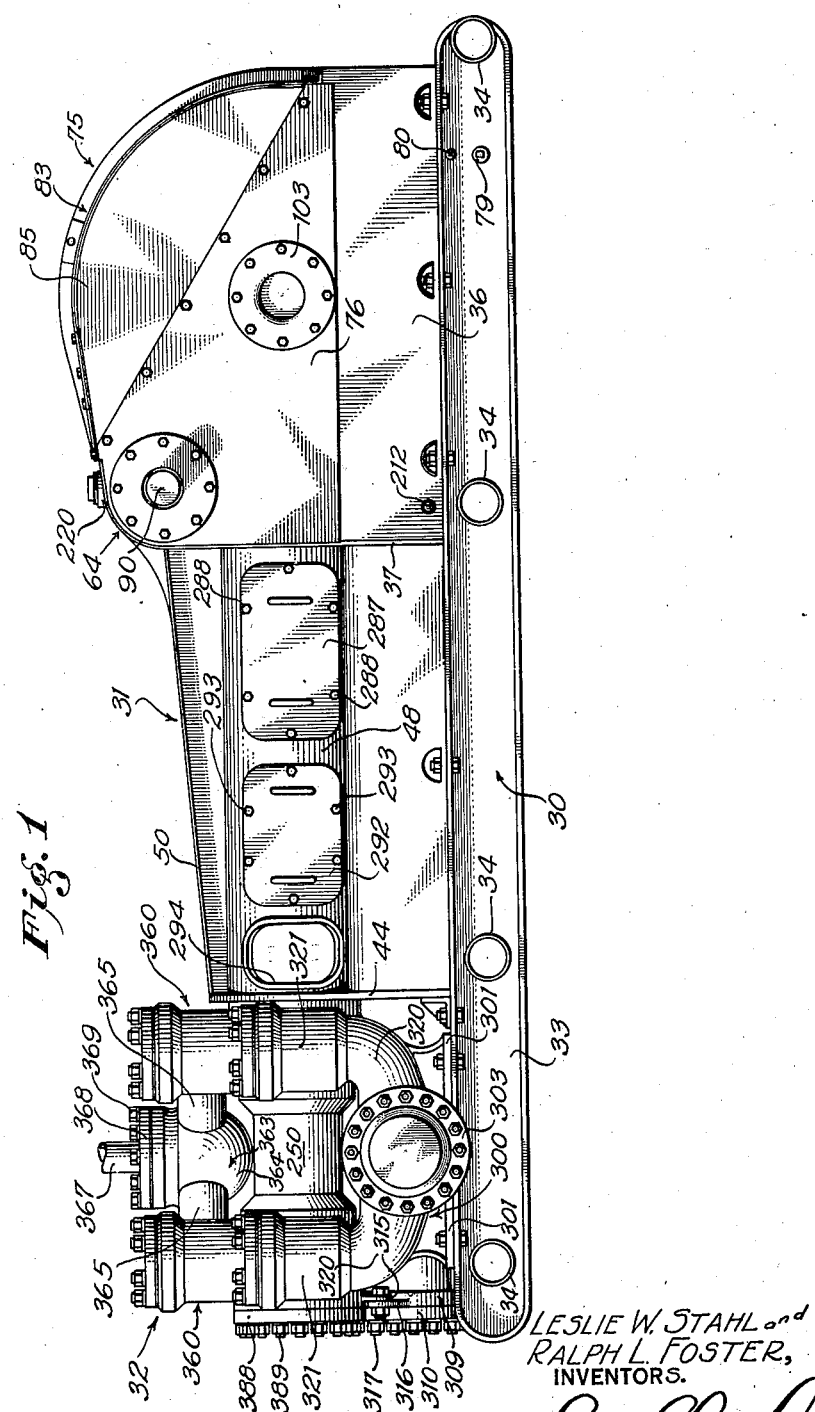

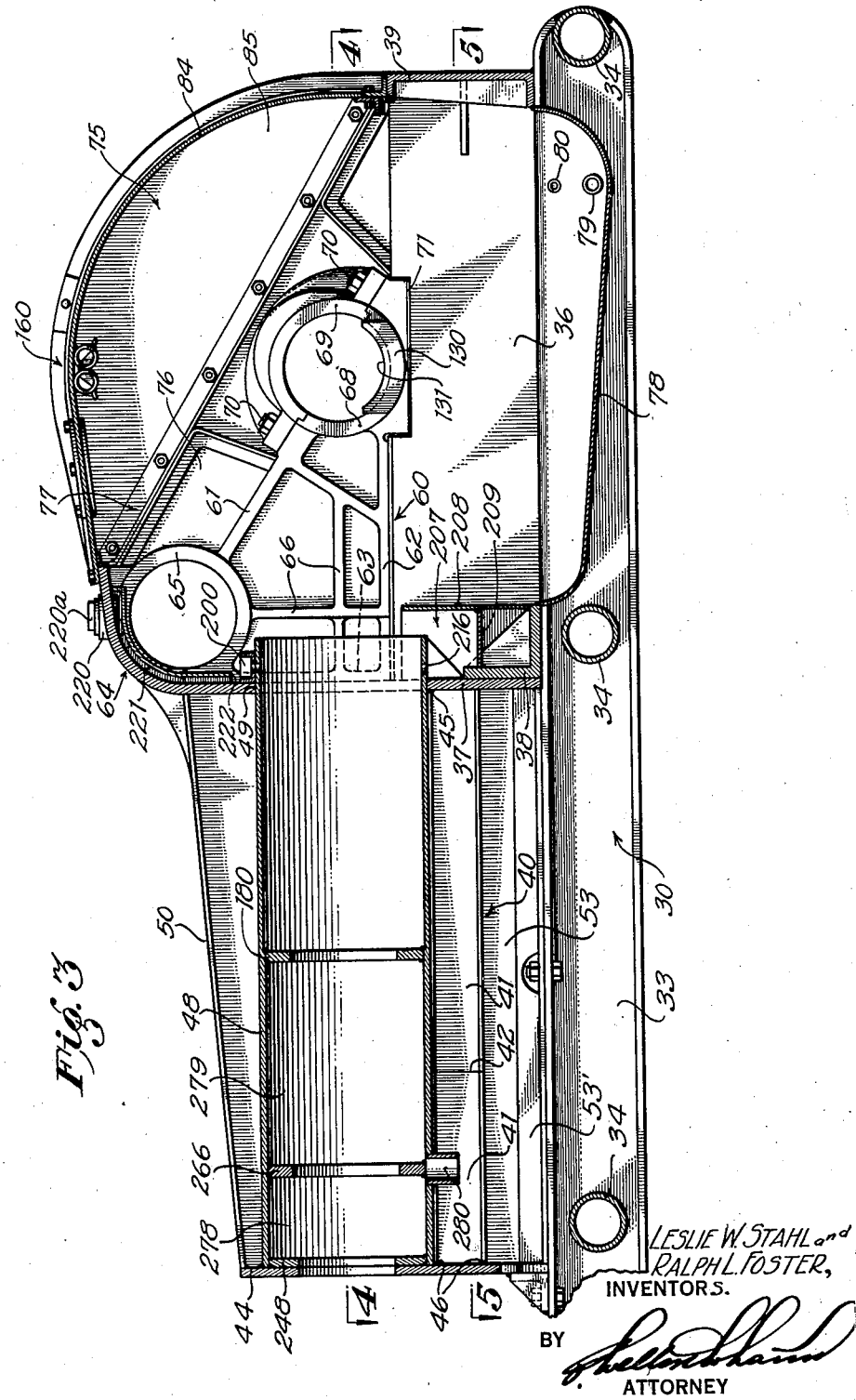

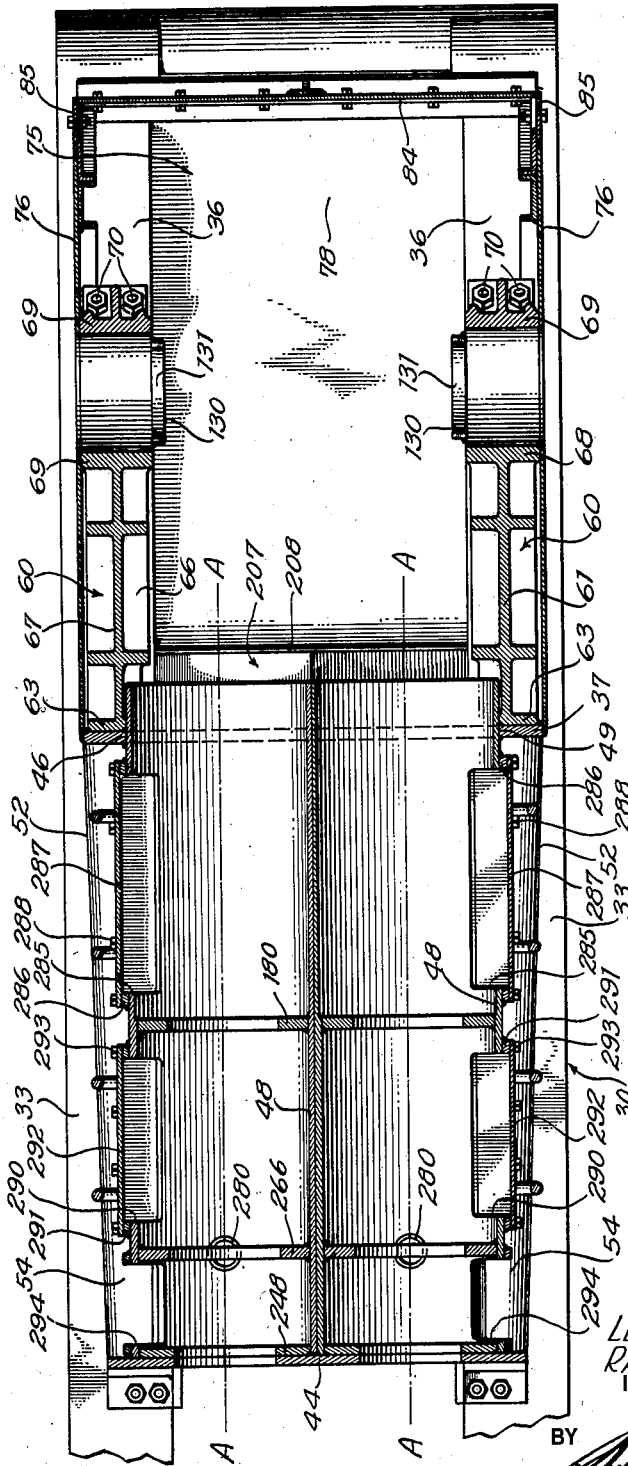

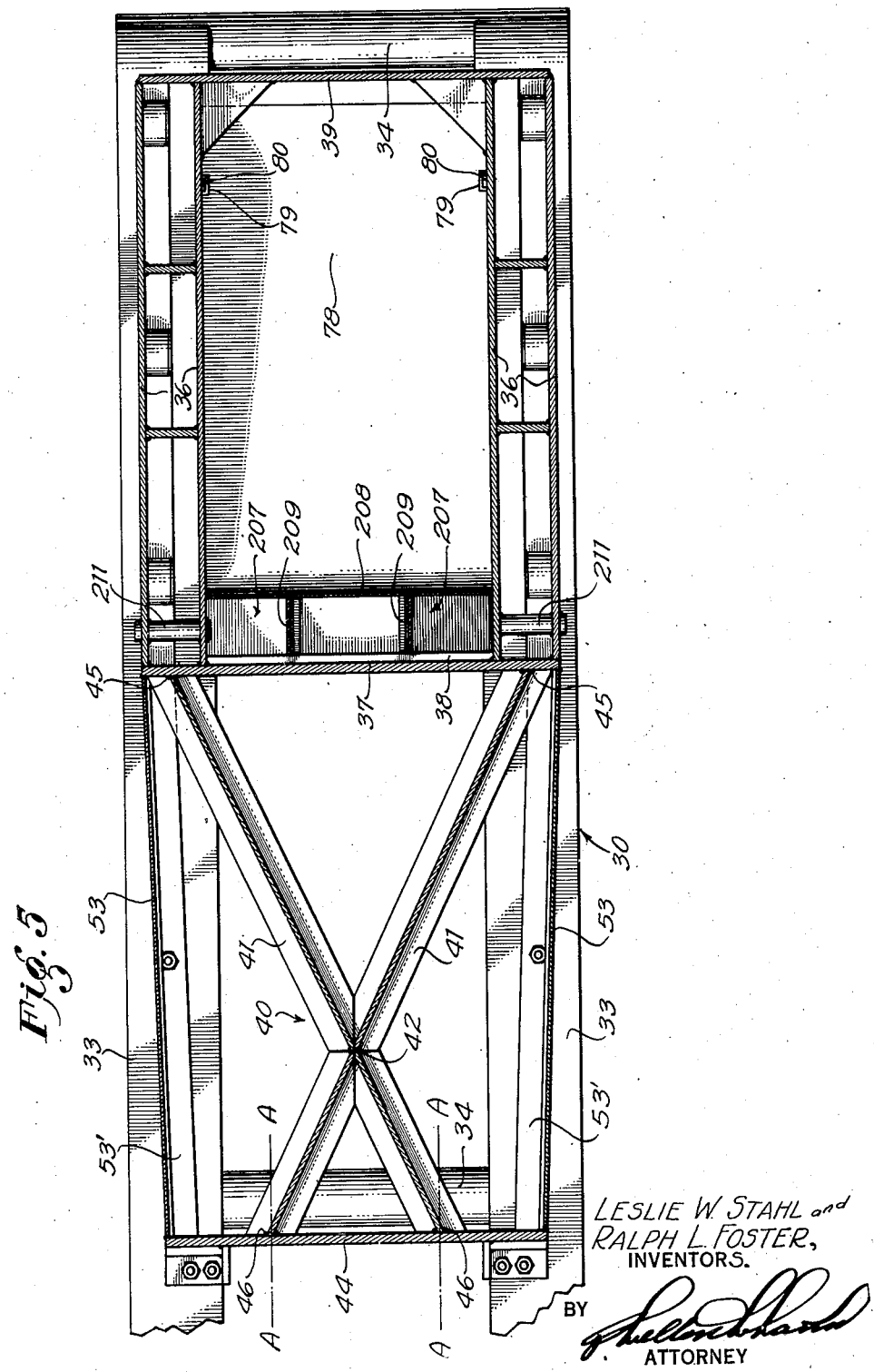

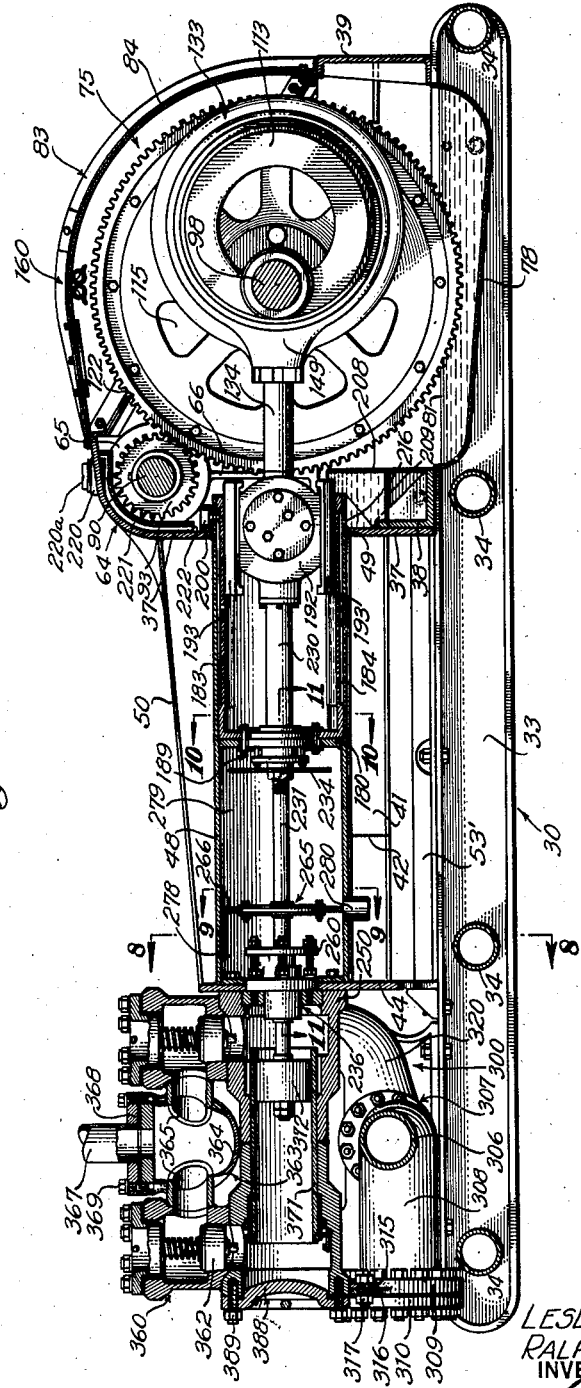

Fig. 3

Oct. 12, 1943.    L. W. STAHL    2,331,513
SLUSH PUMP
Original Filed Dec. 18, 1937    9 Sheets-Sheet 8
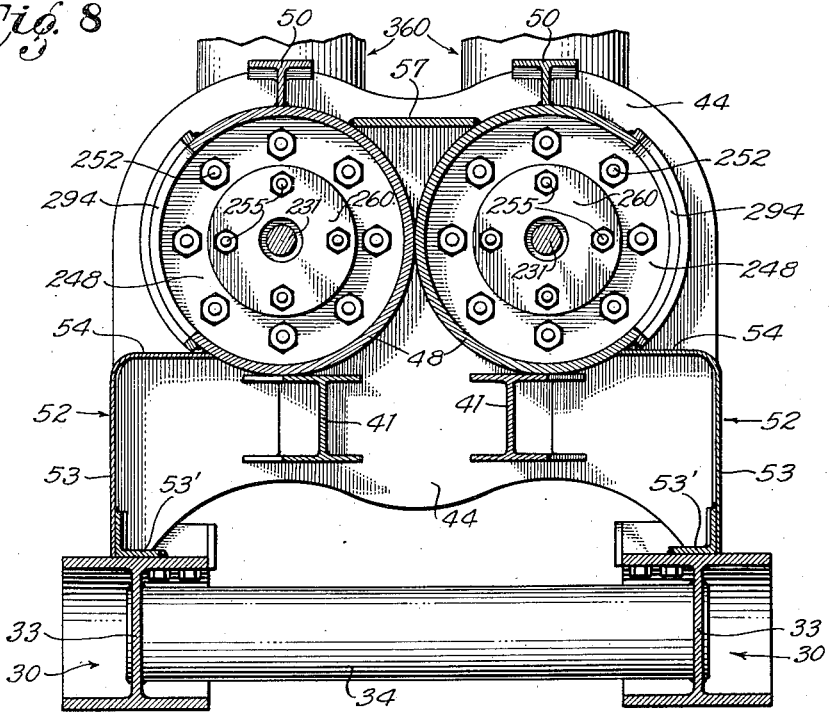
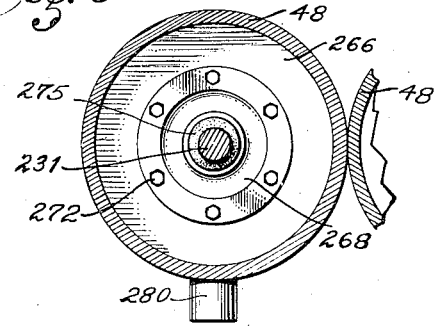
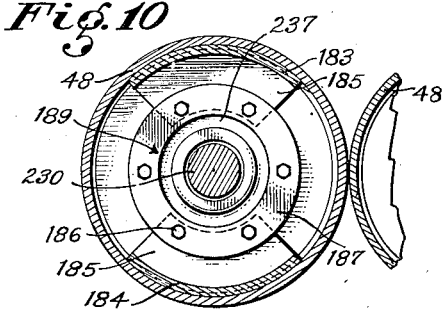
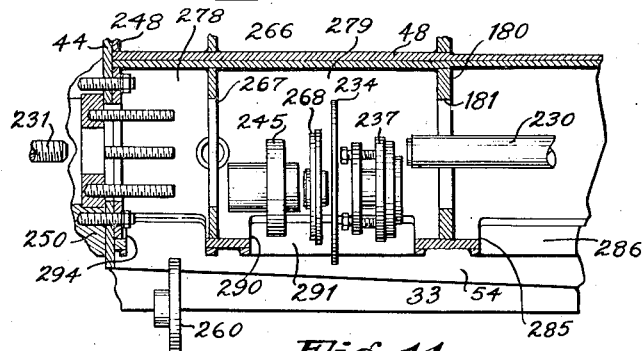
LESLIE W. STAHL and
RALPH L. FOSTER,
INVENTORS.
BY 
ATTORNEY

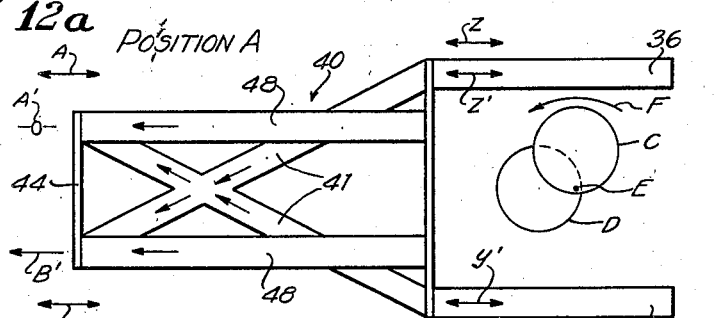
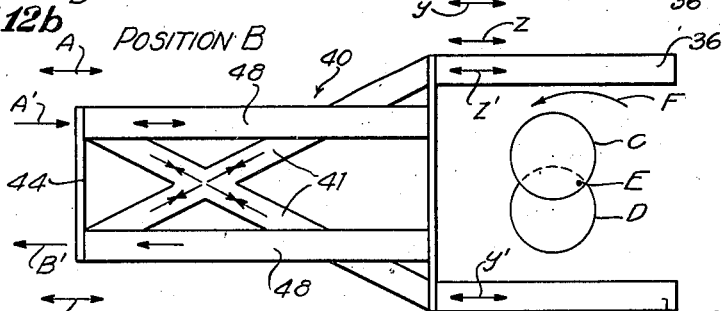
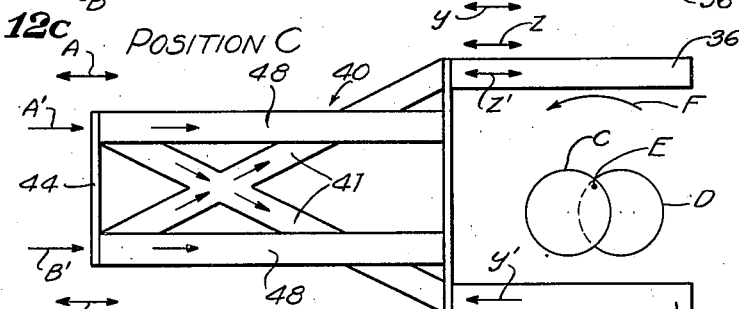
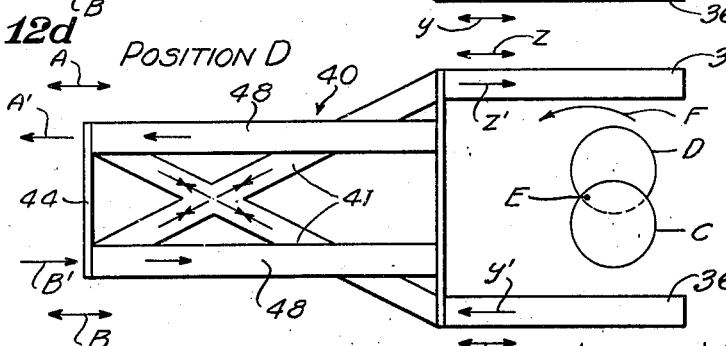

Patented Oct. 12, 1943

2,331,513

UNITED STATES PATENT OFFICE 2,331,513

SLUSH PUMP

Leslie W. Stahl and Ralph L. Foster, Houston, Tex., assignors to Emsco Derrick & Equipment Company, Los Angeles, Calif., a corporation of California Original application December 18, 1937, Serial No. 180,554. Divided and this application October 30, 1940, Serial No. 363,581

8 Claims. (Cl. 103—218)

Our invention relates a pump adapted to pump fluid and relates in particular to slush pumps such as are commonly employed in the oil well drilling art for pumping rotary mud or slush into the well during the drilling operation.

This application is a division of our copending application for Slush pump, Serial No. 180,554, filed December 18, 1937.

Although our invention is useful in many industries wherein fluid is pumped under pressure, it has a particular utility in the oil well drilling industry and therefore that form of our invention designed for use as a slush pump in the oil well drilling industry will be described herein. In order that the features and advantages of our invention may be readily understood the oil well drilling industry will now be referred to. It is common practice to drill oil wells by use of a bit of drill connected to the lower end of a drill pipe which is extended into the well, this drill pipe being rotated by a rotary machine placed on the derrick floor. Connected to the upper end of the string of drill pipe is a swivel by means of which the string of drill pipe is supported by the travelling block and by means of which rotary mud may be pumped into the upper end of the drill pipe. The swivel ordinarily employed in this art includes a goose neck to which a flexible hose is connected, the flexible hose being connected to a stand pipe which in turn is connected to the slush pump or mud pump which is usually positioned at one side of the derrick floor.

As the well drilling industry has advanced and wells drilled deeper the slush pump is called upon to deliver the rotary mud or slush at relatively high pressure in order to force the same downwardly through the drill pipe to the lower end of the well and then upwardly through the well around the drill pipe and to the surface of the ground. At the present time it is not uncommon for the slush pump to deliver 1500 pounds per square inch. This rotary mud or slush usually consists of a mixture of earth and water so as to form a muddy consistency which can be suitably pumped as a fluid, and it is common practice to mix with the rotary mud, heavier material, such as iron oxide, barium sulphate, and the like, in order to give the rotary mud sufficient weight to support the walls of the hole being drilled. The rotary mud therefore is a highly abrasive material which produces a very severe attritional or wearing action on the various parts of the slush pump.

Due to the pressures which must be pumped and due to the abrasive qualities of the slush, the slush pump is subjected to considerable punishment and it is therefore necessary for the pumps, as they are constructed today, to be quite massive in size and to incorporate heavy castings, which, of course, result in the slush pump being relatively heavy and awkward to transport.

Our invention deals primarily with a slush pump of the power-driven type, wherein rotative power from an external source is applied to a pinion shaft and by use of gears and a means of transforming it to reciprocating motion is delivered to a fluid end having reciprocating pistons for the pumping of fluid.

It is an object of our invention to provide a slush pump in which the power end of the pump, instead of being made from massive and sizeable castings, is fabricated; that is, the various parts are made from high tensile strength structural steel shapes and plates which are formed and welded together. We have found that by such a method of construction which incorporates valuable features of design and construction of our invention that not only is the slush pump more economical to produce but the necessary strength is obtained by less weight and less size of the various parts. The slush pump constructed in accordance with this object of our invention is considerably lighter and more compact than prior art constructions employing casting.

It is a still further object of our invention to provide a double-acting duplex slush pump, that is, one having two cylinders both of which are double acting, the pistons operating out of phase in order to pump a substantially continuous stream under uniform pressure, and in which the power frame is made relatively light as compared to slush pumps now used in the prior art but in which the power frame is especially designed to withstand the forces and stresses transmitted through it during the operation of the pump.

It is a still further object of our invention to provide a pump of the character referred to having a power frame in which the members are secured together as by welding, and which includes an X-frame structure extending from the force end to the reaction end of the frame, and in which all members are designed to resist tension, compression and diagonal stresses.

It is another object of our invention to provide a pump of the character referred to in which the points of application of the forces to the power frame at the fluid end or pump end are closer together than the reaction points at the opposite end, and in which the forces applied at either of the force points are transmitted directly to both reaction points.

It is another object of our invention to provide a slush pump in which the stuffing box positioned around the piston rod is removable from the pump without disconnecting the fluid end of the pump from the power end thereof.

It is another object of our invention to provide a slush pump in which the stuffing box for the cross-head rod is removable for replacement or repair.

A further object of our invention is to provide a pump in which a removable cross-head rod stuffing box is mounted in a frame partition without the necessity of drilling or tapping bolt or stud holes in said partition.

A still further object of our invention is to provide a slush pump employing a deflector baffle placed around the pump rod between the piston rod stuffing box and cross-head rod stuffing box which closes the space and includes a wiping means which wipes any rotary mud from the rod.

Another object of our invention is to provide a construction of the character pointed out in the preceding paragraphs in which the deflector baffle is removable for the convenience of assembling and also to permit the installing or removal of the piston rod stuffing box from place.

Another object of our invention is to provide a construction whereby a removable deflector baffle of type described in preceding paragraphs is so mounted in the frame partition in a manner that precludes the necessity of drilling or tapping holes for studs or bolts in the partition.

Referring to the drawings in which we have illustrated our invention embodied in a slush pump adapted for use in the oil drilling industry, Fig. 1 is an elevational view of such a slush pump.

Fig. 2 is a plan view of Fig. 1.

Fig. 3 is a vertical sectional view showing the power frame construction prior to the time the various parts are machined and without the various moving parts being assembled in position. This view is intended to illustrate the manner in which the various fabricated parts are positioned with respect to each other and welded together.

Fig. 4 is a horizontal sectional view taken as indicated by the line 4—4 of Fig. 3.

Fig. 5 is a horizontal sectional view taken as indicated by the line 5—5 of Fig. 3.

Fig. 6 is a vertical sectional view through the slush pump of our invention taken through the plane of one of the pump cylinders, one of the cross-heads and one of the eccentrics showing the various parts of one half of the pump.

Fig. 7 is an enlarged fragmentary sectional view showing the details of construction and the manner in which the various stuffing boxes arranged to prevent leakage of fluid from the pump end into the lubricated enclosed portion of the power end.

Fig. 8 is a vertical cross-sectional view taken on the line 8—8 of Fig. 6, this view showing the relationship between the various parts of the frame at this particular place.

Fig. 9 is a fragmentary sectional view taken on the line 9—9 of Fig. 6 and showing the deflector means of our invention.

Fig. 10 is a fragmentary sectional view taken as indicated by the line 10—10 of Fig. 6 and showing the cross-head rod stuffing box of our invention.

Fig. 11 is a fragmentary sectional view taken on the line 11—11 of Fig. 6 showing the manner in which the various stuffing box parts may be removed without disconnecting the pump end and the power end of the apparatus from each other.

Fig. 12a is a diagram illustrating the forces or stresses in the frame of the power end of our invention, the forces existing during one position of the eccentrics.

Fig. 12b is a view similar to Fig. 12a showing the eccentrics in another position.

Fig. 12c is a similar view showing the eccentrics in a succeeding position.

Fig. 12d is a further similar view showing the eccentrics further rotated.

Referring to the drawings in detail our invention provides a base structure 30 on which is supported the power end of the slush pump 31 and the pump or fluid end of the slush pump 32. The base consists of two longitudinal skid beams 33 secured together by suitable tubular spreader members 34 thus providing a relatively rigid base construction on which the other parts of the apparatus are supported and to which they are secured, such as by the various bolting means illustrated in various views of the drawings.

The drive end, or power end, of our invention includes a frame construction supported by the base, which frame construction incorporates certain unique features and will now be described.

Figure 3:
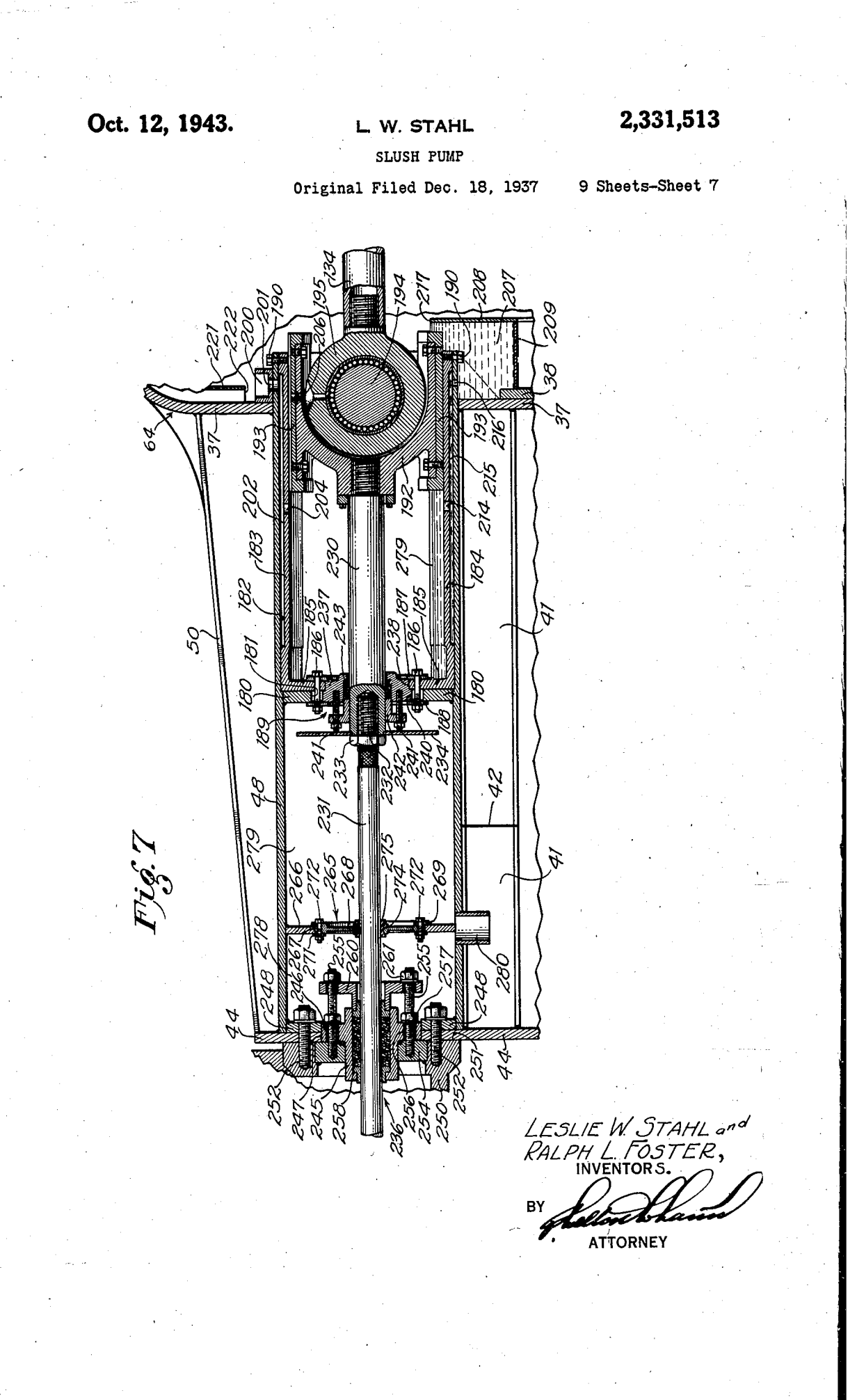

As shown in Figs. 3, 4, 5, 6, and 8, the frame construction which may be referred to as the power frame includes a pair of longitudinal beams 36 each of which may consist of a pair of channels welded together as shown. At the forward end of the two beams 36 which are spaced apart as shown, and which extend parallel to each other, there is a vertical wall or end member 37 which is secured to the forward end of the longitudinal beams 36 preferably by welding as illustrated in Fig. 5. Extending transversely between the forward end of the two beams 36 and secured thereto and also secured to the end wall 37 is an intermediate cross-angle 38, which forms a part of the frame. The rearward ends of the beams 36 are connected together by an end beam 39 which is in the form of an upstanding channel as shown in Figs. 3 and 5. Extending forward from the intermediate wall 37 in a horizontal plane is an X-frame 40 which consists of two longitudinal members 41 which cross each other and are welded together at 42 in a plane corresponding to the vertical longitudinal axis of the slush pump. At the forward end of the X-frame 40 is a front member or abutment plate 44 which extends in a vertical plane as shown. The rearward ends of the members 41 are welded to the vertical wall 37 as indicated at 45 while the forward ends of the members 41 are welded to the abutment plate 44 as indicated at 46. The rearward ends of the members 41 are in alignment with the longitudinal axes of the beams 36 while the forward ends of the members 41 are in alignment with the axes A—A of the cylinders of the fluid end of the pump, as will be described. Positioned concentric to the axes A—A are barrels or tubular members 48 which are positioned side by side in a horizontal plane as illustrated. The forward ends of the barrels 48 are welded to the rear surface of the front member, or abutment plate 44. The rearward ends of the barrels 48 project rearwardly through openings 49 formed in the vertical wall 37, and are welded to the vertical wall as shown. It will be seen that the barrels 48 are positioned directly above the X-frame 40. For the purpose of stiffening the barrels 48 there is secured as by welding to the upper portion of each barrel a stiffening member 50, the forward end of which is welded to the front member 44 and the rearward end of which is welded to the intermediate or vertical wall 37. To fill in the open spaces around the barrels 48 there is, as provided in Fig. 8, a top plate 57 which fills the V-space at the top intermediate part between the barrels 48, and there are also provided filler or deck plates 52 which are shaped as shown in Fig. 8 including vertical walls 53 and horizontal walls 54. These deck plates 52 are secured in place by welding, and each include a forward reinforcing angle 53' adapted to rest on the longitudinal skid beam 31.

Also forming a part of the power frame are bearings supporting castings 60, which are shown best in Figs. 3 and 4. These frames 60 are castings, as distinguished from the other parts of the frame which are either made from sheet metal rolled to suitable shape or steel structural members. These castings 60 are two in number and one is placed so as to rest on each of the beams 36, and to be positioned directly in back of the vertical wall 37. Each casting 60 is triangular in its general shape including a central vertical web or wall 61 which terminates in a lower flange 62 adapted to rest on the upper surface of one of the longitudinal beams 36, and adapted to be welded thereto. The forward part of each casting 60 is in the form of a flange 63 which is adapted to engage the rear surface of the vertical wall 37 and to be welded thereto. It will be noted that the upper part of the vertical wall 37 is rounded rearwardly, as indicated at 64, so as to conform to the shape of the castings 60. The upper forward portion of each casting 60 and immediately adjacent to the rearwardly rounded portion 64 of the vertical wall 37 is provided in the form of a cylindrical journal 65, which is formed integral with the wall 61, the front wall 63 and also various cross walls or webs 66 illustrated in various views. At the rearward lower part of each of the castings 60 in a plane lower than the journals 65 and in substantially the plane of the axes A—A are journals 68 which are formed by channels in the casting 60 and cooperating cap members 69 which are removably secured in place by suitable stud bolts 70. The bearing supporting castings or frames 60 are welded to the longitudinal beams 36 and vertical wall 37 along opposite sides of each of the castings such as indicated at 71, this welding operation being preferably simultaneously performed in order to prevent a warping and distortion.

The various frame parts which have been described constitute the substantial part of the power frame of our invention. All of the parts referred to, with the exception of the two castings 60, are made from sheet steel or steel structural member. Various parts as explained are formed to suitable shape, fabricated, and welded together to provide a rigid frame construction. The importance of design of this frame construction will be pointed out in detail after every part of the apparatus and operation have been described, and when various forces and stresses set up in the frame during operation are discussed.

The rearward part of the power frame provides a crank case or gear case 75 which will now be described. As shown best in Figs. 3, 4, and 6, the forward part of the crank case 75 is defined by the vertical wall 37, while the sides thereof are formed by the castings 60, beams 36 and side plates 76 which are secured thereto as shown in Fig. 3. The side members extend downwardly from the upper forward parts of the castings 60 and the rear parts meet the beams 36 at the cross-beam 39, the upper edge of each side member 76 sloping downwardly and rearwardly as indicated at 77 in Fig. 3. Placed between the cross-angle 38, and end beam 39, and between the skid beam 31 is an oil pan 78 which is welded in place as shown. The bottom of the oil pan 78 slopes downwardly toward the rear and is provided with an oil drain 79 and an oil level check 80 so that the oil level in the oil pan 78 may be maintained substantially at an oil level indicated at 81 in Fig. 6. For closing the upper part of the crank case 75 there is a removable cover 83 which has a curved wall 84 extending laterally across the crank case and has depending side walls 85 which extend downwardly and meet the side walls 76 as shown in Fig. 3. These parts just enumerated provide a crank case or gear case in which various operating parts of the apparatus are located.

As shown in Fig. 6 our invention provides a jack shaft or pinion shaft 90 which, as shown in Fig. 2, extends outwardly from opposite sides of the pump construction so that a drive means may be applied to either end thereof. The jack shaft 90 is rotatably supported by bearings 91 mounted within bearing retainers 92 which are in turn removably secured in the journals 65. Mounted on the central part of the jack shaft 90 is a pinion 93 which is of smaller diameter than the openings through the journals 65 so that the jack shaft assembly may be inserted into place through either of the journals 65. The bearing retainers enclose the bearing 92 and are insertable into the journals 65 from the outer sides thereof, being secured in place by suitable bolts 94.

Our invention provides a main shaft 98 which is rotatably supported by bearing units 99 as shown. Mounted on the main shaft 98 is a gear and eccentric arrangement. Mounted on each of the eccentrics 113 is an eccentric strap 133 which, as shown in Fig. 6, has a forwardly extending eccentric strap rod 134 connected to a cross-head of the apparatus.

Referring to Figs. 6 and 7, we will now describe the cross-head construction of our invention. Secured in each of the barrels 48 is an annular support 180 which consists of an annular plate welded in place and having a cylindrical opening 181 formed therethrough. That portion of each barrel 48 which lies to the right or toward the crank case side of the support 180 is machined as indicated at 182, and the annular wall 181 is likewise machined.

Positioned in each of the barrels 48 are upper and lower cross-head guides 183 and 184 which have inwardly extending flanges 185 which are secured in place by bolts 186 extending through split rings 187 and 188, which bolts 186 and rings 187 and 188 are also employed to hold a cross-head stuffing box 189 in place, as will be described later. The rightward end of the cross-head guides 183 and 184 are secured to the rightward end of each tubular member or barrel 48 by suitable bolts 199. Adapted to be reciprocated in the guides 183 and 184 is a cross-head which is operatively connected by the eccentric strap rod 134 to the eccentric strap 133. Each cross-head includes a cross-head block 192 which has secured thereto suitable shoes 193 which are adapted to be journalled and to reciprocate in the guides 183 and 184. The block 192 carries a shaft 194 on which a bearing 195 is swingably mounted, this bearing 195 having secured to it at the leftward end the eccentric strap rod 134.

Extending from the cross-head block 192 in a direction toward the fluid end of the slush pump is a cross-head rod 230 which extends through the cross-head stuffing box 189. Threadedly connected to each cross-head rod 230 is a piston rod 231, this connection being made by a threaded end 232 of the piston rod 231 screwing into a threaded opening provided by each cross-head rod 230. A lock nut 233 is provided, and in the preferred form of our invention we provide a baffle plate 234 which is secured at the end of each cross-head rod 230 by each nut 233 which prevents any foreign matter, or slush, or the like from being directed against the stuffing box parts 189. This piston rod 231 extends leftwardly toward the fluid end of the pump, and passes through a pump stuffing box 236 and into the fluid end of the pump, as will be discussed later.

Each of the cross-head stuffing box constructions is provided in the form of a stuffing box body 237 which has an annular wall 238 which is engaged by the inner ends of the flanges 185. The body 237 is positioned so that the annular shoulder 240 is clamped between the inner ends of the flanges 185 of the guides 183 and 184 and the split rings 188 when the bolts 186 are secured in place. It will be seen that the body 237 is rigidly secured in place, and that a leak-proof seal is provided. Extending leftwardly from the body 237 are stud bolts 241 which hold a gland 242 in place, which gland compresses packing 243 and thus forms a seal around the cross-head rod 230.

The pump stuffing box 236 is provided in the form of a body 245 which has an outwardly extending flange 246. This flange 246 rests within a cylindrical opening 247 formed in the abutment wall 44 and also in a widening ring 248 which is welded to the abutment wall 44 inside each of the barrels 48. Cylinders of the fluid end of the pump, which will be designated by the numeral 250, have end faces 251 which are clamped against the leftward face of the abutment wall 44 by means of stud bolts 252 which extend through the abutment wall 44 and widening ring 248. The cylinders 250, of course, are secured with their axes concentric to the axes A—A shown on Fig. 5. Each cylinder 250 carries an end ring 254 from which studs 255 extend as shown in Figs. 7 and 8. These studs 255 extend through openings 256 provided in the flanges 246 and nuts 257 are employed to secure the body 245 against the adjacent end plate 254. Packing 258 positioned within the body 245 is compressed to provide a fluid-tight seal around the piston rod 231 by means of a gland 260 which is secured in place by nuts 261 threaded onto the studs 255.

Between the two stuffing boxes 189 and 236 we provide a deflector means designated by the numeral 265. This construction includes an annular support 266 which is secured in each barrel 48 by welding. Each support provides an annular opening 267 in which a deflector wall 268 is received. The deflector wall 268 accurately fits the opening 267 and is aligned thereby. The deflector wall 268 has an outwardly extending flange 269 which engages the rightward wall of the support 266. Placed on the opposite side of the support 266 is a split ring 271, and extending through the deflector wall 268 and through the split ring 271 are bolts 272 which secure the ring 271 to the deflector wall 268 and in this way the deflector wall is secured in the annular support 266 without requiring drilling for bolts. Each of the deflector walls 268 has an opening 274 in which a rubber bushing 275 is positioned, this rubber bushing 275 of each assembly forming a running fit around the associated piston rod 231. The function of the rubber bushing 275 is to prevent leakage of rotary mud or other foreign matter past the deflector means 265 and to wipe any foreign matter from the piston rod as it moves in a rightward direction.

It will be seen that the deflector means positioned in each of the barrels 48 divides each barrel 48 into an end section 278 and an intermediate section 279. Any foreign matter which enters either of these sections may be drained therefrom by means of a drain tube 280 positioned directly below each of the deflector means.

The pump stuffing box 245 is, of course, provided to form a seal around the pump rod 231 so that there will be no leakage from the pump cylinders. In the event of leakage through this stuffing box the deflector means 265 will ordinarily function to prevent foreign matter from passing into the intermediate section 279. Any foreign matter which leaks into the end section 278 can be drained therefrom through the drain tube 280. Should the deflector means 265 fail, the baffle 234 functions to prevent any stream of fluid from being directed directly against the cross-head stuffing box 189. Should any foreign matter reach the cross-head rod 230, the cross-head stuffing box 189 functions to prevent foreign matter from entering the rightward end of the barrel 48 which, as will be seen, is in direct communication with the crank case and, in fact, forms a part thereof. Should, however, foreign matter in same way pass through these various protecting means which we provide and get into the lubricant, this lubricant before it is delivered to the oil pan 78 is first passed through the settling chamber 207 so that this foreign matter will be separated therefrom.

Ready access may be had to the interior of the barrels 48 in view of the fact that we have provided hand holes 285 in the rightward end of the barrels 48 so that access may be had to that portion of the barrel in which the cross-head operates. Welded to the barrels around the hand holes 285 are box shaped members 286 to which hand hole covers 287 may be secured for closing the hand holes during normal operation of the slush pump. By the removal of the bolts 288 the hand hole covers 287 may be removed and access to the interior may be had. The intermediate sections 279 are rendered accessible through hand holes 290 formed in the barrels, these hand holes being surrounded by box structures 291 welded to the barrels, and which hand holes are closed by covers 292 removably secured in place by bolts 293. Access to the end section 278 of each of the barrels 48 may be had through inspection holes 294 which are always left open.

Through the inspection holes 294 the pump stuffing box 236 may be inspected and the gland thereof tightened. Through the hand hole 290 the stuffing box 189 may be inspected and the gland tightened. Likewise, the condition of the rubber bushing 275 may be inspected.

It is one of the features of our invention that the various parts in the barrels may be reached for inspection and that the stuffing boxes 189, 236, and the deflector wall 268 may be removed from the slush pump without disconnecting the power end and fluid end of the apparatus. As illustrated in Fig. 11, when the piston rod 231 is disconnected from the cross-head rod 230 and the various parts of the stuffing box 236, including the body 245, the various parts of the stuffing box 189, including the body 237, the baffle 234, and the deflector wall 268 are disconnected from their supporting parts, they may be moved outwardly through the hand hole 290. It will be seen that the parts of the stuffing box 189 when disconnected may be moved leftwardly and then moved outwardly through the hand hole 290. The baffle 234 may likewise be moved directly outward through the hand hole 290. The deflector wall 268 when disconnected may be moved to the right and then moved outwardly through the hand hole 290. When the deflector wall 268 is removed the body 245 of the stuffing box 236 may then be moved rightwardly through the end section 278, through the opening 267 in the annular support 266, and into the intermediate section 279, from which it may be moved laterally through the hand hole 290.

The fluid end of the slush pump of our invention is, as previously pointed out, mounted on the base 33. The fluid end includes the two cylinders 250 which, as previously explained, are rigidly secured against the abutment wall 44. Supported on each of the skid beams 33 is an intake manifold 300 which has feet 301 which rest on the skid beams 33 and are removably secured thereto by bolts as shown. The details of construction do not constitute a part of the invention claimed herein.

In the operation of the slush pump of our invention the eccentric members 110 are so positioned with relation to each other that the eccentrics 113 are 90° out of phase; that is to say, they are spaced around the axis of rotation of the main shaft 98 a distance of 90° from each other. Any angular phase desired and in accordance with ordinary pump practice may, however, be employed. In operating the device adequate lubricant is, of course, placed in the crank case to assure proper lubrication of the parts. A drive means is connected to the jack shaft or pinion shaft 99 and through the interconnecting mechanism the two eccentrics 113 are rotated in order to move the cross-heads back and forth, which in turn move the pistons 372 in the liners 371. When the piston, such, for example, as illustrated in Fig. 6, is moved from the position shown in full lines in a leftward direction fluid is drawn into the rightward end of the cylinder through the suction valve and through the connecting portion of the suction manifold. At the same time any fluid which is in the leftward end of the cylinder is forced outwardly through the outlet valve and through the manifold pipe 365 into the manifold pot 364. At the same time, however, the piston in the other cylinder is moving in the opposite direction and fluid is being pumped from the right end of that other cylinder through the outlet valve, the upper valve chest 360, and the manifold pipe 365 which directly opposes the manifold pipe which is connected to the valve chest associated with the left end of the first mentioned cylinder. It will be seen, therefore, that at this time there are opposing flows of fluid into the exhaust manifold pot 364, and that instead of the stream of fluid engaging a wall the two streams of fluid are brought together and guided upwardly, and in this way wear is reduced. When the direction of movement of the pistons change the fluid which was, during the previously mentioned stroke of the pistons, drawn into the cylinder is then forced therefrom and fluid is drawn into the opposite end of the cylinder ready to be forced therefrom upon a change of direction of the pump piston. This operation is, of course, in accordance with standard practice and is referred to here only so that the construction of the discharge manifold may be explained and the value of its design referred to in connection with the flows of fluid outwardly from the opposite ends of the pump cylinders.

In Fig. 12a we have diagrammatically illustrated the essential parts of the power frame in order that the various forces transmitted therethrough during the operation of our pump may be illustrated.

Referring to the four views, Figs. 12a, 12b, 12c, and 12d, which are referred to as positions A to D inclusive, the force applied in either direction through the upper cylinder piston arrangement is referred to as the force A, while the force applied through the lower piston arrangement is referred to as the force B. The circle C represents the position of the lower eccentric and the circle D represents the position of the upper eccentric. The dot E represents the center around which the eccentrics are rotated in a direction indicated by the arrow F. When the eccentrics C and D are in the positions shown the force B is in the direction indicated by the arrow B' while the force A is zero as indicated by the zero A'. The reactions at the opposite end of the frame are indicated by Y and Z and with the force B being in the direction indicated at B' and the force A being zero, the reactions are as indicated by Y' and Z'. The forces transmitted through the various parts of the frame are as indicated by the arrows applied to the parts 48 and 41, as shown in position A. The points of application of the forces which may be called force points are concentric to the axes A—A of the cylinders, and are somewhat closer together than the reaction points which are along the beams 36. The forces A and B are transmitted through the barrels 48 to reaction points on the same side of the frame and by the members 41 to reaction points on the opposite side of the frame.

Positions B, C, and D are drawn on the same basis as the diagram position A except that the eccentrics C and D are in the different positions as illustrated and the forces A and B and the reactions Y and Z are as illustrated on the various views by the notations "A" and "B." Likewise, the forces transmitted through the various parts 48 and 41 are as illustrated by the arrows applied to these parts in the different views.

It will be seen that the forces range between zero and maximum in one direction, zero and maximum in the opposite direction, and from forces in the same direction to forces in the opposite direction. Figs. 12a to 12d inclusive, it is believed, clearly illustrate the manner in which the frame of our invention is adapted to transmit the various forces and to minimize the possibility of eccentric loading and the reduction of coupled forces. The box X construction, including the X-frame 40, in combination with the end plates and the tubular members 48, provides a very rigid construction which is well adapted and well capable of withstanding the various forces illustrated.

We claim as our invention:

1. In a pump of the class described, the combination of: longitudinal beams; an end wall member attached in transverse relation to the forward ends of said beams; a front wall member spaced forwardly of said end wall member in parallel relation thereto; barrels connected to said end wall member and said front wall member; operating means supported by said longitudinal beams behind said end wall member; a pumping assembly for said pump secured to the front of said front wall member; said pumping assembly including a fluid displacing pumping element; interconnecting means in said barrels for operatively connecting said operating means and said pumping element; and an X-frame connected to said end wall member and said front wall member in a plane adjacent to the lower faces of said barrels, said X-frame cooperating with said barrels to absorb the reversing forces resulting from operation of said fluid end by said operating means.

2. In a pump of the class described, the combination of: a pair of laterally spaced longitudinal beams; an end member comprising a transverse wall attached to the forward ends of said beams; a front member comprising a transverse wall spaced forwardly of said end member; a pair of laterally spaced substantially parallel barrels connected to said end member and said front member, the ends of said barrels being open; supporting frames secured to said longitudinal beams and said end member behind said end member; operating means supported by said frames in the space between said longitudinal beams; a pumping assembly for said pump secured to the front of said front member; said pumping assembly including a fluid displacing pumping element; and interconnecting means extending through and guided in said barrels for operatively connecting said operating means and said pumping element.

3. In a pump of the class described, the combination of: a pair of laterally spaced longitudinal beams; an end member comprising a transverse wall attached to the forward ends of said beams; a front member comprising a transverse wall spaced forwardly of said end member; barrels connected to said end member and said front member, said front member and said end member having openings coinciding with the ends of said barrels; walls forming a case behind said end member; walls forming cross-head chambers in said barrels in communication with said case; operating means in said case disposed between and supported by said longitudinal beams; cross-head means in said cross-head chambers and operatively connected to said operating means; a pumping assembly for said pump connected in front of said front member; said pumping assembly including a fluid displacing pumping element; and interconnecting means operatively connecting said cross-head means and said pumping element.

4. In a pump of the class described, the combination of: spaced longitudinal metal beams; an end member comprising a transverse metal wall welded to the forward ends of said beams; a front wall member spaced forwardly of said end wall member; metal barrels in side by side relation with the ends thereof welded to said end wall member and said front wall member; walls forming a case behind said end wall member; walls forming cross-head chambers in said barrels in communication with said case; operating means in said case supported by and between said beams; cross-head means in said cross-head chambers and operatively connected to said operating means; a pumping assembly for said pump connected in front of said front wall member; said pumping assembly including a fluid displacing pumping element; interconnecting means operatively connecting said cross-head means and said pumping element; a cross-head stuffing box at the forward part of each cross-head chamber; a pump stuffing box at the forward end of each of said barrels through which said interconnecting means extends; and crossing members extended below said barrels in a horizontal plane which is parallel to the axes of said barrels and extends through said longitudinal beams, the ends of said crossing members being welded to said end wall member and said front wall member.

5. In a pump of the class described, the combination of: a pair of substantially parallel longitudinal beams; a transverse end wall member attached to the forward ends of said beams; a transverse front wall member spaced forwardly of said end wall member; longitudinal frame members connected to said end wall member and said front wall member, and being closer together than said longitudinal beams; crossing members connected to said end wall member and to said front wall member and lying in a plane which passes through said longitudinal beams; a pumping assembly secured in front of said front wall member; said pumping assembly including a fluid displacing pumping element; operating means supported by said longitudinal beams in a position between them; and interconnecting means operatively connecting said operating means and said pumping element.

6. In a pump of the class described, the combination of: a pair of substantially parallel longitudinal beams; a transverse end wall member attached to the forward ends of said beams; a transverse front wall member spaced forwardly of said end wall member; longitudinal frame members connected to said end wall member and said front wall member, and being closer together than said longitudinal beams; crossing members lying in a horizontal plane which passes through said longitudinal beams connected to said end wall member in substantially the vertical planes defined by said longitudinal beams and to said front wall member in substantially the vertical planes defined by said longitudinal frame members; a pumping assembly secured in front of said front wall member and having cylinders in substantially the same vertical planes as said longitudinal frame members; a fluid displacing pumping element in each cylinder; operating means supported by and between said longitudinal beams; and interconnecting means operatively connecting said operating means and said pumping elements.

7. In a duplex pump having a pair of pumping units in side by side relation, said pumping units each including a fluid displacing pumping element, operating means for said pumping units and connecting means extending from said operating means to the pumping elements of said pumping units, the combination of: a pair of metal tubes in side by side relation; an end member comprising a transverse metal wall welded to the rear ends of said tubes, and having openings therein coinciding with said tubes; a front member comprising a transverse metal wall welded to the front ends of said tubes and having openings therein coinciding with said tubes; means for connecting said operating means and said pumping units respectively to said end member and said front member; and removable cylindric means within said tubes to guide said first mentioned connecting means.

8. In a duplex pump having a pair of pumping units in side by side relation, said pumping units each including a fluid displacing pumping element, operating means for said pumping units and connecting means extending from said operating means to the pumping elements of said pumping units, the combination of: a pair of metal tubes in side by side relation; an end member comprising a transverse metal wall welded to the rear ends of said tubes, and having openings therein coinciding with said tubes; a front member comprising a transverse metal wall welded to the front ends of said tubes and having openings therein coinciding with said tubes; metal cross-members extending from said end member to said front member in a plane parallel to the plane defined by the longitudinal axes of said tubes, and having the ends thereof welded to said end member and said front member; means for connecting said operating means and said pumping units respectively to said end member and said front mmeber; and means within said tubes to guide said first mentioned connecting means.

LESLIE W. STAHL.
RALPH L. FOSTER.